(No Model.) 4 Sheets—Sheet 2.
G. B. HOPPER.
MACHINE FOR MAKING SHEET METAL CANS.
No. 484,014. Patented Oct. 11, 1892.
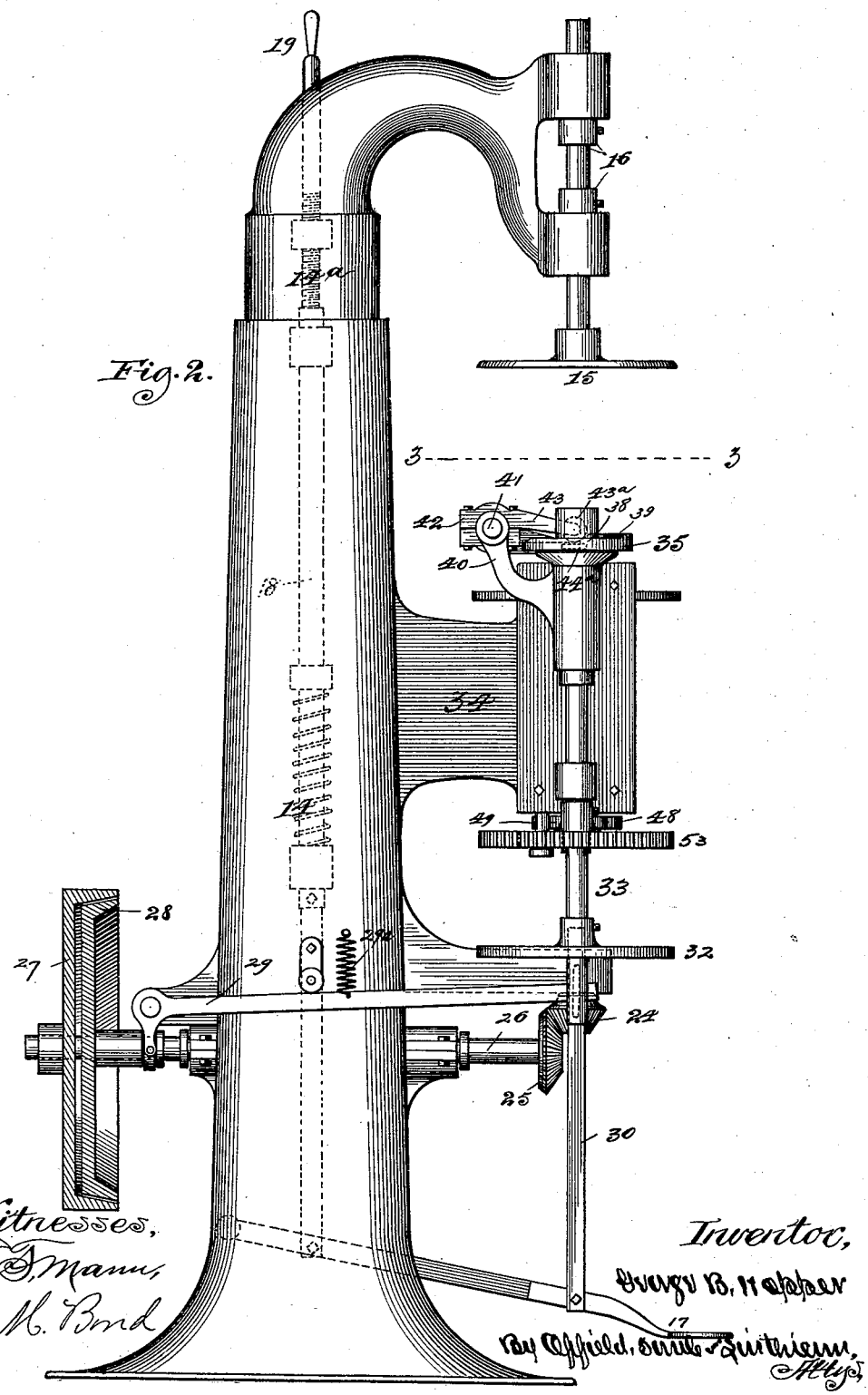

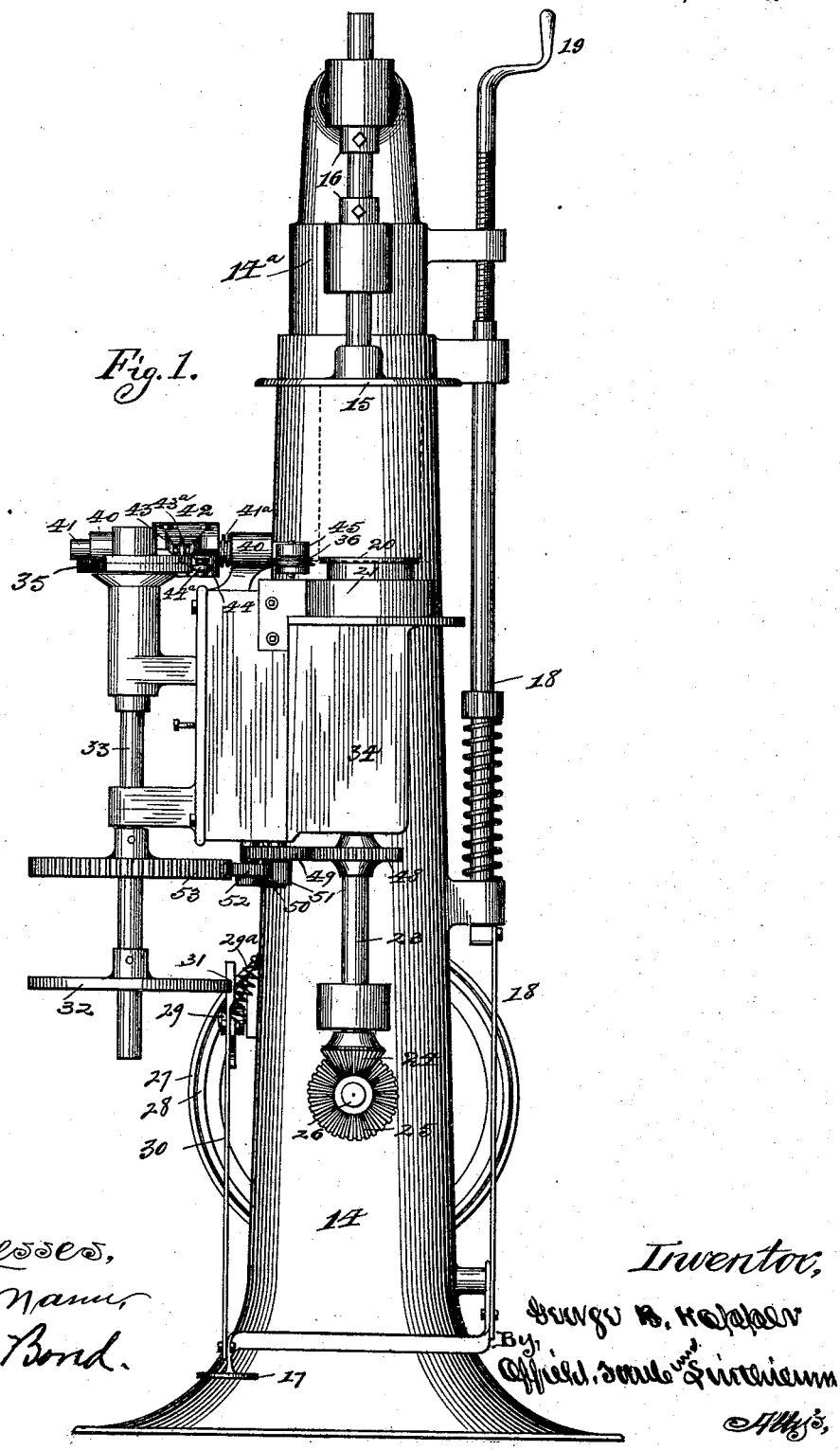

(No Model.)  
4 Sheets—Sheet 3.
G. B. HOPPER.
MACHINE FOR MAKING SHEET METAL CANS.
No. 484,014.  
Patented Oct. 11, 1892.
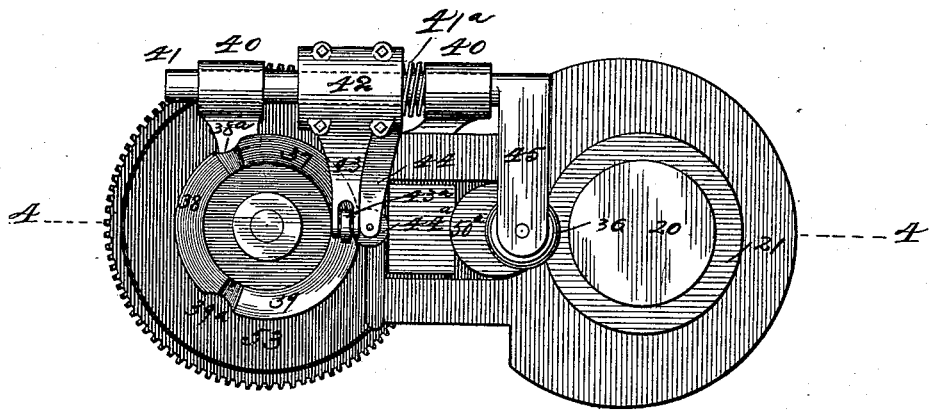
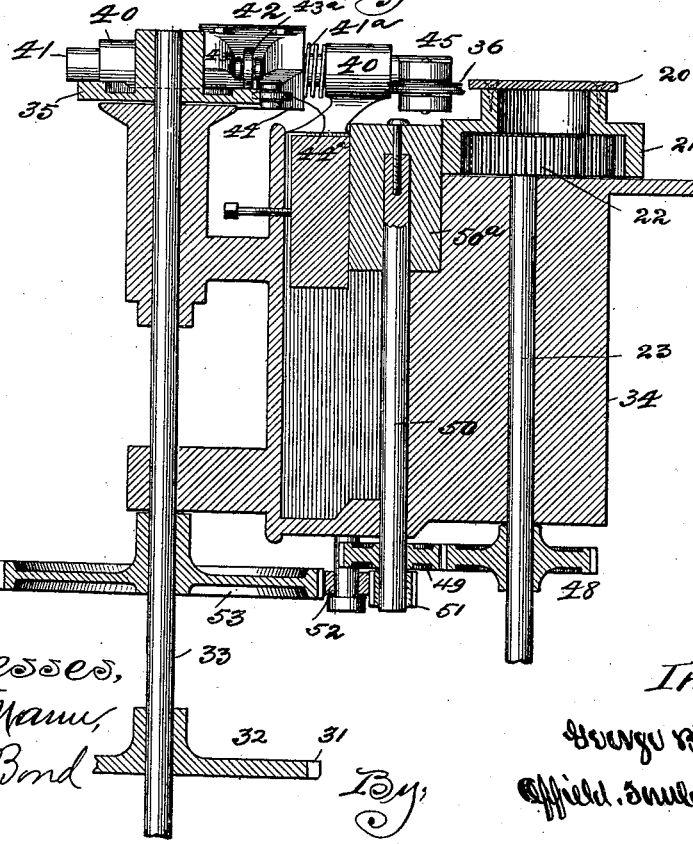

(No Model.) 4 Sheets—Sheet 4.
G. B. HOPPER.
MACHINE FOR MAKING SHEET METAL CANS.
No. 484,014. Patented Oct. 11, 1892.
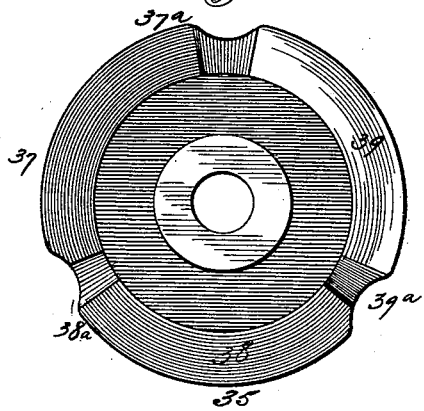
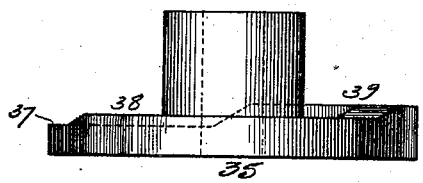
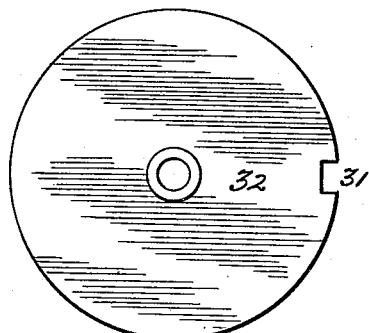
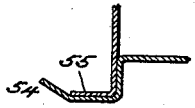
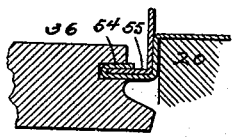
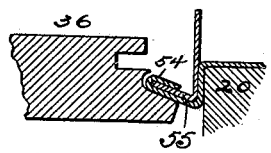
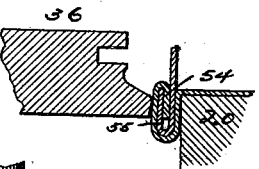
Witnesses, Inventor,
George B. Hopper
By
Attys.
THE NORRIS PETERS CO., PHOTO-LITHO., WASHINGTON, D. C.

UNITED STATES PATENT OFFICE.

GEORGE B. HOPPER, OF CHICAGO, ILLINOIS, ASSIGNOR TO THE FAIRBANK CANNING COMPANY, OF SAME PLACE.

MACHINE FOR MAKING SHEET-METAL CANS.

SPECIFICATION forming part of Letters Patent No. 484,014, dated October 11, 1892.

Application filed March 23, 1891. Serial No. 386,010. (No model.)

*To all whom it may concern:*

Be it known that I, GEORGE B. HOPPER, a citizen of the United States, residing at Chicago, Illinois, have invented certain new and useful Improvements in Machines for Making Sheet-Metal Cans, of which the following is a specification.

This invention relates to machines for uniting the heads to the bodies of sheet-metal cans by means of an interlocking seam; and the invention consists in the devices and combinations of devices for this purpose, which are hereinafter described, and particularly pointed out in the claims.

The seam which this machine is adapted to form is produced by interlocking an outwardly-turned flange from the body and a flange projecting from the head of larger diameter than the body-flange, the interlocked portions being bent into an upright position and resting against the body. The can is presented to the machine with the head adjusted to the body and with their projecting flanges in contact and the flange of the head bent at an angle to the plane of the head and also at an angle to the body. To complete the seam, it is therefore necessary to bend the projecting flange of the head over the body-flange, so as to inclose the body-flange by the folds of the head-flange, and then these interlocked flanges must be bent to an upright position and lie against the outside of the body of the can to complete the seam. I divide this work into three operations, the first consisting in folding the head-flange over upon the body-flange, the second in turning the interlocked flanges up at an acute angle with the body, and the third in bending these interlocked portions up against the body. To perform these operations, I employ a rotatable can-support, upon which the can is clamped, a seaming-wheel adjustably mounted and having its periphery adapted to perform the several operations before described in completing the seam, and a pattern-wheel which controls the movements of the seaming-wheel and automatically adjusts it at the close of one operation into position to perform the next operation, and suitable gearing for driving the various parts in due order.

The machine which is shown in the accompanying drawings comprises a standard which supports the operative parts of the machine and is provided with a sliding head, in which is adjustably fixed a top-clamp, and a bracket on which is rotatably mounted the can-support and also the pattern-wheel and seaming-wheel, the pattern-wheel being preferably in the shape of a rotatable disk having upon its surface three cam-tracks and the seaming-wheel being mounted upon a rock-shaft, the movement of which is controlled by an arm having a roller resting upon the pattern-wheel. The gearing is so arranged that it is controlled by the movement of a foot-treadle, which is also adapted to operate the top-clamp. By preference the can-support is made removable, so that it can be adapted to cans of different sizes.

In the accompanying drawings, Figure 1 is a front elevation; Fig. 2, a side elevation; Fig. 3, a partial plan view below the line 3 3 of Fig. 1. Fig. 4 is a sectional elevation on the line 4 4 of Fig. 3. Fig. 5 is a plan view of the pattern or cam plate; Fig. 6, a side elevation thereof. Fig. 7 is a plan view of a disk forming a part of a clutch mechanism. Fig. 8 is a sectional elevation of the seaming wheel or die. Figs. 9 to 12, inclusive, show the seam in different stages of formation; and Fig. 13, a sectional detail view of the can as presented to the machine.

14 represents a standard having a reciprocating head 14$^a$. Said head bears a clamping-disk 15, which may be adjusted vertically by means of the collars 16, which are fixed by set-screws. The head 14$^a$, carrying the clamping-disk, is vertically reciprocated by means of a foot-treadle 17, having an adjustable connecting-rod 18, the upper end of said rod being threaded and terminating, if desired, in the crank 19.

The lower support for the can (marked 20) is removably secured to a rotating table 21, and said table has internal gear-teeth enmeshed with a pinion 22, carried on a shaft 23, the lower end of which has a miter-gear 24, enmeshed with a miter-gear 25 on a driving-shaft 26, carrying a loose belt-pulley 27. The belt-pulley runs continuously; but in order to provide for the placing and removal of the cans the can-support is intermittently rotated. This may be done in several ways; but I have shown a friction-clutch device, which is thrown into operation by the foot-treadle and having an automatically-operating spring to throw it out of clutch. The inner face of the belt-pulley 27 is recessed to provide one member of a friction-clutch, the other member 28 being splined on shaft 26. Its hub is engaged by the short end of a pivoted bell-crank 29, and the long arm of the bell-crank is connected to a link 30, which is pivotally connected with the foot-treadle 17. The link 30 has its upper end projected beyond its connection with the bell-crank 29 and is adapted to enter a locking-notch 31 in a disk 32, carried upon a shaft 33, which is journaled in suitable bearings carried upon a bracket 34, projecting from the upright frame. After placing the can upon its support the foot-treadle will be depressed, withdrawing the projecting end of the link 30 from the notch in the disk and at the same time forcing the clutch member 28 into engagement with its fellow 27, and thus locking the belt-pulley 27 with the shaft 26 and rotating the latter and, through the gearing above described, the can-support. At the same time the clamp 15 will be brought down to clamp the can.

Upon the upper end of the shaft 33 is affixed the pattern-wheel 35, having its face provided with the cam-tracks 37, 38, and 39. Journaled in bearings 40 is a rock-shaft 41, on which is secured a block 42, having arms 43 44, carrying rollers $43^a$ $44^a$, respectively, the former being adapted to travel upon the cam-tracks 37 38 39 and the latter to travel upon the periphery of the disk or pattern 35. It is evident that the rotation of the cam-disk therefore will cause the rocking of the shaft 41. Said shaft has a crank 45, thereon which carries a seaming-wheel 36. (Shown particularly in Fig. 8.) This seaming-wheel has a circumferential groove 46, the walls of which are parallel, and a semicylindrical groove 47, and below the last-named groove the face of the seaming-wheel may be straight or slightly beveled. The shaft 33 is so geared as to make one revolution, while the can-support completes three revolutions, since there are three operations necessary to the forming of the particular seam shown in Figs. 9 to 12, inclusive. I have shown means for rotating the shaft 33 from the shaft 23, said means comprising a gear 48 on shaft 23, which is enmeshed with a gear 49 on a shaft 50, said shaft having a pinion 51 enmeshed with a small gear 52, the latter driving the gear 53 on shaft 33. The shaft 50 has a friction cap or block $50^a$, in contact with the periphery of the table 21, and the function of which block is to hold the internal gear-teeth of the table 21 enmeshed with the pinion 22. The table 21 may be removed and a table of different size applied where it is desired to operate on a larger or smaller can, or the can-support 20 may be replaced by one of different size.

In order to permit the vertical adjustment of the seaming-wheel, it must be withdrawn from contact with the can at the completion of each stage of the operation. To attain this, the periphery of the pattern-wheel 35 is recessed or notched at $37^a$, $38^a$, and $39^a$, these notches being at the beginning of the cam-tracks 37, 38, and 39, respectively. A spring $41^a$ is coiled about shaft 41 between the bearing 40 and the arm 41, the tendency of said spring being to move the shaft outwardly, and this is permitted whenever the roller $44^a$ enters one of the depressions in the periphery of the pattern-disk.

In operation the can is placed upon its support 20, and then the foot-treadle is depressed, operating to bring into frictional contact the clutch members 27 and 28 and at the same time by means of the link 18 bringing the can-support 15 into position to clamp and hold the can. The seaming-wheel at the commencement of the operation will be in position to engage the flange 54 of the head of the can, and the seaming-wheel will be controlled by that portion of the can marked 37, upon which the roller $43^a$ will just be entering. By the time the roller $43^a$ has traversed that portion of the can marked 37 the can-support will have completed one revolution, thus folding the flange 54 over upon the flange 55 of the body, as seen in Fig. 10. By this time the roller $44^a$ enters the depression $38^a$ and the rock-shaft is shifted to withdraw the seaming-wheel from contact with the can. At the conclusion of this movement the pattern-wheel has been rotated so as to cause the roller $43^a$ to ride up the incline from the can 37 to that portion marked 38, which causes the elevation of the seaming-wheel to the position shown in Fig. 11, bringing the rounded margin of the interlocked flanges into the semicylindrical groove 47, and during the revolution of the can the seaming-wheel bends the interlocked flanges into the position shown in Fig. 11. By the time this operation is completed the pattern-wheel has revolved so as to bring the cam 39 beneath the roller $43^a$, thus further rocking the shaft 41 and lifting the seaming-wheel to the position shown in Fig. 12, in which position it is rotated in contact with the interlocked flanges and folds them into an upright position, as shown in Fig. 12. At the end of this movement the seam is completed, unless it be desired to apply solder thereto. The disk 32 being carried on the same shaft as the pattern-wheel, they of course revolve in equal time, and during the operation of forming the seam the link 30 will be held depressed by the disk. At the completion of the operation the notch 31 will be brought again over the link 30, and then the bell-crank will be rocked by the spring $29^a$, thus throwing the machine out of gear, and the end of the link 30, entering the locking-notch of the disk, holds the friction-clutch out of gear until the treadle is again depressed.

The machine may be used for applying either or both heads to the can, and by varying the configuration of the pattern-wheel it may be employed with cans having seams formed of a greater or less number of bends or folds.

I claim—

1. In a can-machine, the combination, with a rotatable can-support, of a seaming-wheel mounted upon a rock-shaft, a pattern-wheel adapted to control the rocking of said shaft, and a spring for moving the shaft endwise in its bearings, whereby to move the seaming-wheel from the work, substantially as described.

2. The combination, in a can-machine substantially such as herein described, of a rotatable can-support, a seaming-wheel having its periphery grooved to engage and bend the flanges of the can to form the seam, a rock-shaft supporting the seaming-wheel and having an arm or crank bearing upon cam-surfaces formed in a rotating disk or pattern-wheel, whereby the rocking of the shaft is controlled, said disk having depressions in its periphery, upon which the rock-shaft arm also bears, and a spring for shifting the rock-shaft endwise to release it from contact with the can, substantially as described.

3. In a can-making machine, the combination, with a rotatable can-support, of a seaming-wheel, a rock-shaft or frame upon which the seaming-wheel is mounted, a rotatable pattern-wheel having cams adapted to engage and rock the seaming-wheel support, a spring for moving the shaft endwise in its bearings, whereby to move the seaming-wheel from the work, and suitable gearing for driving the parts in due order, substantially as described.

4. In a can-making machine, the combination, with a rotatable can-support, of a seaming-wheel, a rock-shaft upon which the said wheel is mounted, a rotatable pattern-wheel, means for imparting an endwise movement to the rock-shaft, and suitable gearing for actuating the said parts, substantially as described.

5. In a can-machine, the combination, with a rotatable can-support, of a movable clamp for holding the can upon the support, a seaming-wheel, a rock-shaft for supporting the said wheel, a spring for imparting an endwise movement to the said shaft, a rotatable pattern-wheel having cam-surfaces upon which the said shaft bears, and mechanism for rotating the said parts, substantially as described.

GEORGE B. HOPPER.

Witnesses:
C. C. LINTHICUM,
RUDOLPH WOLFNER.